(12) United States Patent
Trombetta et al.

(10) Patent No.: US 10,765,938 B2
(45) Date of Patent: Sep. 8, 2020

(54) DE-INTERLEAVING GAMEPLAY DATA

(71) Applicant: SONY INTERACTIVE ENTERTAINMENT LLC, San Mateo, CA (US)

(72) Inventors: Steven Trombetta, San Mateo, CA (US); Christopher Thielbar, San Francisco, CA (US); James Fairbairn, Novato, CA (US); Adil Sherwani, Oakland, CA (US)

(73) Assignee: SONY INTERACTIVE ENTERTAINMENT LLC, San Mateo ( * ) Notice: Subject to any disclaimer, the term of this patent is extended or adjusted under 35 U.S.C. 154(b) by 0 days.

(21) Appl. No.: 15/908,657

(22) Filed: Feb. 28, 2018

(65) Prior Publication Data

US 2019/0262706 A1 Aug. 29, 2019

(51) Int. Cl.
| | |
|---|---|
| *A63F 13/32* | (2014.01) |
| *A63F 13/30* | (2014.01) |
| *A63F 13/86* | (2014.01) |
| *G06F 16/71* | (2019.01) |
| *G06F 16/738* | (2019.01) |

(52) U.S. Cl.
CPC .............. *A63F 13/30* (2014.09); *A63F 13/86* (2014.09); *G06F 16/71* (2019.01); *G06F 16/739* (2019.01)

(58) Field of Classification Search
CPC .......... A63F 13/30; A63F 13/86; G06F 16/71; G06F 16/739
USPC .......................................................... 463/31
See application file for complete search history.

(56) References Cited

U.S. PATENT DOCUMENTS

| | | | |
|---|---|---|---|
| 5,729,471 A | * | 3/1998 | Jain ...................... H04N 13/139 725/131 |
| 5,995,518 A | | 11/1999 | Burns et al. |
| 6,415,317 B1 | | 7/2002 | Yelon et al. |
| 6,631,522 B1 | | 10/2003 | Erdelyi |
| 6,877,134 B1 | | 4/2005 | Fuller et al. |
| 7,499,475 B2 | | 3/2009 | Kashiwagi et al. |

(Continued)

FOREIGN PATENT DOCUMENTS

| | | |
|---|---|---|
| WO | WO 2014/109435 | 7/2014 |
| WO | WO 2018/160274 | 9/2018 |

(Continued)

OTHER PUBLICATIONS

U.S. Appl. 15/448,356 Final Office Action dated Aug. 31, 2018.

(Continued)

*Primary Examiner* — Omkar A Deodhar
*Assistant Examiner* — Shauna-Kay Hall
(74) *Attorney, Agent, or Firm* — Polsinelli LLP

(57) ABSTRACT

The subject disclosure relates to the de-interleaving of captured game data for the creation of separate video data and statistical metadata repositories. In some aspects, a process of the disclosed technology includes steps for capturing gameplay data based on live gameplay in a game environment, the gameplay data comprising video data and statistical metadata based on player interactions with the game environment, de-interleaving the video data and the statistical metadata, storing the video data to a first database, and storing the statistical metadata to a second database, the first database being different from the second database. Systems and machine-readable media are also provided.

20 Claims, 4 Drawing Sheets

(56) References Cited

U.S. PATENT DOCUMENTS

| | | | |
|---|---|---|---|
| 8,025,572 B2 | 9/2011 | Spanton et al. | |
| 8,187,104 B2* | 5/2012 | Pearce | A63F 13/10 463/43 |
| 8,202,167 B2 | 6/2012 | Ackely et al. | |
| 8,645,844 B1 | 2/2014 | Strobel et al. | |
| 9,233,305 B2* | 1/2016 | Laakkonen | A63F 13/10 |
| 9,433,855 B1 | 9/2016 | Keeker et al. | |
| 9,473,825 B2 | 10/2016 | Gossweiler et al. | |
| 9,782,678 B2 | 10/2017 | Long et al. | |
| 9,860,477 B2 | 1/2018 | Kummer et al. | |
| 9,968,856 B1 | 5/2018 | Ninoles et al. | |
| 10,471,360 B2 | 11/2019 | Trombetta et al. | |
| 2002/0034980 A1 | 3/2002 | Lemmons et al. | |
| 2002/0107040 A1 | 8/2002 | Crandall et al. | |
| 2003/0177347 A1 | 9/2003 | Schneier et al. | |
| 2003/0220143 A1 | 11/2003 | Shteyn et al. | |
| 2004/0147306 A1 | 7/2004 | Randall et al. | |
| 2004/0189701 A1 | 9/2004 | Badt | |
| 2004/0266535 A1 | 12/2004 | Reeves | |
| 2006/0105827 A1 | 5/2006 | Metzger et al. | |
| 2006/0247060 A1 | 11/2006 | Hanson et al. | |
| 2007/0018952 A1 | 1/2007 | Arseneau et al. | |
| 2007/0021058 A1 | 1/2007 | Aresneau et al. | |
| 2007/0070914 A1 | 3/2007 | Abigail | |
| 2007/0117635 A1 | 5/2007 | Spanton et al. | |
| 2007/0248261 A1 | 10/2007 | Zhou et al. | |
| 2008/0079752 A1 | 4/2008 | Gates et al. | |
| 2008/0113815 A1 | 5/2008 | Weingardt et al. | |
| 2008/0200254 A1 | 8/2008 | Cayce et al. | |
| 2009/0036214 A1 | 2/2009 | Dahl | |
| 2009/0208181 A1 | 8/2009 | Cottrell | |
| 2009/0225828 A1 | 9/2009 | Perlman et al. | |
| 2009/0271821 A1 | 10/2009 | Zalewski | |
| 2010/0099330 A1 | 4/2010 | Digiovanni | |
| 2010/0240443 A1 | 9/2010 | Baerlocher et al. | |
| 2011/0207523 A1* | 8/2011 | Filipour et al. | |
| 2011/0263332 A1 | 10/2011 | Mizrachi | |
| 2011/0263333 A1 | 10/2011 | Dokei et al. | |
| 2011/0275431 A1 | 11/2011 | Hirzel et al. | |
| 2012/0093481 A1 | 4/2012 | McDowell et al. | |
| 2012/0283017 A1 | 11/2012 | Ahiska et al. | |
| 2013/0002949 A1 | 1/2013 | Raveendran et al. | |
| 2013/0007013 A1 | 1/2013 | Geisner et al. | |
| 2013/0123019 A1 | 5/2013 | Sullivan et al. | |
| 2013/0254831 A1 | 9/2013 | Buhr et al. | |
| 2013/0296051 A1 | 11/2013 | Gault et al. | |
| 2013/0324239 A1 | 12/2013 | Ur et al. | |
| 2014/0004951 A1 | 1/2014 | Kern et al. | |
| 2014/0087846 A1 | 3/2014 | Bryan et al. | |
| 2014/0087851 A1 | 3/2014 | Low et al. | |
| 2014/0113718 A1 | 4/2014 | Norman et al. | |
| 2014/0142921 A1 | 5/2014 | Gleadall et al. | |
| 2014/0171039 A1 | 6/2014 | Bjontegard | |
| 2014/0171182 A1 | 6/2014 | Versaci | |
| 2014/0179440 A1 | 6/2014 | Perry | |
| 2014/0274307 A1 | 9/2014 | Gonzalez | |
| 2014/0274370 A1 | 9/2014 | Shah | |
| 2014/0297408 A1* | 10/2014 | Zabala | G06Q 30/0255 705/14.53 |
| 2015/0005052 A1 | 1/2015 | Harrington et al. | |
| 2015/0011283 A1 | 1/2015 | Sanford et al. | |
| 2015/0018990 A1 | 1/2015 | Shachar et al. | |
| 2015/0113548 A1 | 4/2015 | Stern et al. | |
| 2015/0141140 A1 | 5/2015 | Lampe et al. | |
| 2015/0248792 A1 | 9/2015 | Abovitz et al. | |
| 2015/0281029 A1 | 10/2015 | Callahan et al. | |
| 2015/0348373 A1 | 12/2015 | Weingardt et al. | |
| 2015/0375117 A1* | 12/2015 | Thompson | A63F 13/35 463/9 |
| 2016/0051895 A1 | 2/2016 | Hood | |
| 2016/0310843 A1 | 10/2016 | Webb | |
| 2016/0365121 A1 | 12/2016 | DeCaprio | |
| 2017/0001111 A1 | 1/2017 | Willette et al. | |
| 2017/0001112 A1 | 1/2017 | Gilmore et al. | |
| 2017/0003740 A1 | 1/2017 | Verfaillie et al. | |
| 2017/0006074 A1 | 1/2017 | Oates | |
| 2017/0072324 A1 | 3/2017 | Navok et al. | |
| 2017/0113143 A1 | 4/2017 | Marr | |
| 2017/0157512 A1 | 6/2017 | Long et al. | |
| 2017/0266549 A1 | 9/2017 | Paradise | |
| 2017/0266552 A1 | 9/2017 | Paradise et al. | |
| 2017/0270751 A1 | 9/2017 | Paradise | |
| 2017/0304724 A1 | 10/2017 | Cotter | |
| 2017/0332131 A1 | 11/2017 | Opsenica et al. | |
| 2018/0077438 A1 | 3/2018 | Hensen et al. | |
| 2018/0139257 A1 | 5/2018 | Ninoles et al. | |
| 2018/0192144 A1 | 7/2018 | McElroy | |
| 2018/0250598 A1 | 9/2018 | Trombetta | |
| 2018/0250600 A1 | 9/2018 | Trombetta | |
| 2019/0262705 A1 | 8/2019 | Trombetta | |
| 2019/0262712 A1 | 8/2019 | Trombetta | |
| 2019/0262713 A1 | 8/2019 | Trombetta | |
| 2019/0262717 A1 | 8/2019 | Thielbar | |
| 2019/0262720 A1 | 8/2019 | Trombetta | |
| 2019/0262723 A1 | 8/2019 | Trombetta | |
| 2019/0262724 A1 | 8/2019 | Trombetta | |
| 2019/0262727 A1 | 8/2019 | Trombetta | |
| 2019/0266845 A1 | 8/2019 | Trombetta | |
| 2020/0179812 A1 | 6/2020 | Trombetta | |

FOREIGN PATENT DOCUMENTS

| | | |
|---|---|---|
| WO | WO 2018/165191 | 9/2018 |
| WO | WO 2019/168614 | 9/2019 |
| WO | WO 2019/168615 | 9/2019 |
| WO | WO 2019/168619 | 9/2019 |
| WO | WO 2019/168620 | 9/2019 |
| WO | WO 2019/168630 | 9/2019 |
| WO | WO 2019/168631 | 9/2019 |
| WO | WO 2019/168636 | 9/2019 |
| WO | WO 2019/168637 | 9/2019 |
| WO | WO 2019/168638 | 9/2019 |
| WO | WO 2019/168646 | 9/2019 |

OTHER PUBLICATIONS

U.S. Appl. No. 15/448,356, Steven Trombetta, System and Method for Managing Online Gaming League, filed Mar. 2, 2017.
PCT/US18/13378, System and Method for Managing Online Gaming League, Jan. 11, 2018.
U.S. Appl. No. 15/908,569, Chris Thielbar, Online Tournament Integration, Not Yet Assigned.
U.S. Appl. No. 15/908,722, Steven Trombetta, Statistical Driven Tournaments, Not Yet Assigned.
U.S. Appl. No. 15/908,635, Steven Trombetta, Statistically Defined Game Channels, Not Yet Assigned.
U.S. Appl. No. 15/908,531, Steven Trombetta, Integrating Commentary Content and Gameplay Content Over a Multi-User Platform, Not Yet Assigned.
U.S. Appl. No. 15/908,438, Steven Trombetta, Incentivizing Players to Engage in Competitive Gameplay, Not Yet Assigned.
U.S. Appl. No. 15/908,345, Steven Trombetta, Player to Spectator Handoff and Other Spectator Controls, Not Yet Assigned.
U.S. Appl. No. 15/908,704, Steven Trombetta, Scaled VR Engagement and Views in an E-Sports Event, Not Yet Assigned.
U.S. Appl. No. 15/908,712, Steven Trombetta, Discovery and Detection of Events in Interactive Content, Not Yet Assigned.
U.S. Appl. No. 15/908,707, Steven Trombetta, Creation of Winner Tournaments With Fandom Influence, Not Yet Assigned.
U.S. Appl. No. 15/448,356 Office Action dated Jan. 8, 2019.
U.S. Appl. No. 15/450,602 Final Office Action dated Nov. 2, 2018.
PCT Application No. PCT/US2019/015120 International Search Report and Written Opinion dated Apr. 15, 2019.
PCT Application No. PCT/US2019/015124 International Search Report and Written Opinion dated Apr. 15, 2019.
PCT Application No. PCT/US2019/016686 International Search Report and Written Opinion dated Apr. 10, 2019.
PCT Application No. PCT/US2019/016698 International Search Report and Written Opinion dated Apr. 11, 2019.

(56) References Cited

OTHER PUBLICATIONS

PCT Application No. PCT/US2019/016694 International Search Report and Written Opinion dated Apr. 15, 2019.
PCT Application No. PCT/US2019/017100 International Search Report and Written Opinion dated Apr. 17, 2019.
U.S. Appl. No. 15/450,602, Steven Trombeta, User-Driven Spectator Channel for Live Game Play in Multi-Player Games, filed Mar. 6, 2017.
PCT/US18/21197, User-Driven Spectator Channel for Live Game Play in Multi-Player Games, Mar. 6, 2017.
PCT Application No. PCT/US2018/021197 International Search Report and Written Opinion dated May 30, 2018.
PCT Application No. PCT/US2018/013378 International Search Report and Written Opinion dated Mar. 8, 2018.
U.S. Appl. No. 15/450,602 Office Action dated Apr. 6, 2018.
PCT Application No. PCT/US2018/013378 International Preliminary Report on Patentability dated Sep. 3, 2019.
PCT Application No. PCT/US2019/016167 International Search Report and Written Opinion dated Aug. 26, 2019.
U.S. Appl. No. 15/908,438 Office Action dated Oct. 3, 2019.
U.S. Appl. No. 15/908,707 Final Office Action dated Nov. 18, 2019.
PCT Application No. PCT/US2019/015123 International Search Report and Written Opinion dated Apr. 23, 2019.
PCT Application No. PCT/US2019/015125 International Search Report and Written Opinion dated Apr. 23, 2019.
PCT Application No. PCT/US2019/016180 International Search Report and Written Opinion dated Apr. 23, 2019.
U.S. Appl. No. 15/450,602 Office Action dated Jun. 28, 2019.
U.S. Appl. No. 15/908,569 Office Action dated Jun. 28, 2019.
U.S. Appl. No. 15/908,722 Office Action dated Jun. 28, 2019.
U.S. Appl. No. 15/908,635 Office Action dated Jun. 28, 2019.
U.S. Appl. No. 15/908,531 Office Action dated Jun. 28, 2019.
U.S. Appl. No. 15/908,704 Office Action dated Jun. 28, 2019.
U.S. Appl. No. 15/908,707 Office Action dated Jul. 17, 2019.
U.S. Appl. No. 15/448,356 Final Office Action dated Aug. 6, 2019.
U.S. Appl. No. 15/908,712 Office Action dated Aug. 8, 2019.
PCT Application No. PCT/US2019/015275 International Search Report and Written Opinion dated Apr. 23, 2019.
U.S. Appl. No. 15/908,345 Office Action dated Jan. 10, 2020.
U.S. Appl. No. 15/448,356 Office Action dated Mar. 5, 2018.
U.S. Appl. No. 16/681,477 Office Action dated Apr. 16, 2020.
U.S. Appl. No. 15/908,569 Office Action dated Mar. 27, 2020.
U.S. Appl. No. 16/681,477, Steven Trombetta, USER-Driven Spectator Channel For Live Game Play In Multi-Player Games, dated Nov. 12, 2019.
U.S. Appl. No. 15/448,356 Office Action dated May 28, 2020.
U.S. Appl. No. 15/908,722 Final Office Action dated Jun. 12, 2020.
U.S. Appl. No. 15/908,704 Final Office Action dated Jun. 12, 2020.

\* cited by examiner

DE-INTERLEAVING GAMEPLAY DATA

BACKGROUND

1. Technical Field

Aspects of the subject technology relate to an online gaming platform, and in particular, to a platform for capturing and de-interleaving gameplay data collected from an online game environment.

2. Description of the Related Art

Like any popular competitive activity, such as football, card games and board games, online games have a large following of fans that appreciate competitive games and highly skilled players. As with other games, such fans also enjoy structured competition amongst peers of comparable skill level. For example, by encouraging a competitive atmosphere amongst peers, fantasy sports leagues and competitions have become a widespread activity. While fantasy leagues for a variety of sports are now widely available, comparable leagues for online games are not readily available for non-professional players.

SUMMARY OF THE CLAIMED INVENTION

Embodiments of the claimed invention include methods and systems for managing an online gameplay platform and in particular, for capturing live gameplay data and de-interleaving the gameplay data into video data and statistical metadata. Such systems can include one or more processors that are configured for capturing gameplay data from live gameplay in a game environment. The gameplay data can include video data and statistical metadata based on player interactions in the game environment. The process can further include steps for de-interleaving the video data and the statistical metadata, storing the video data to a first database, and storing the statistical metadata to a second database, the first database being different from the second database.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
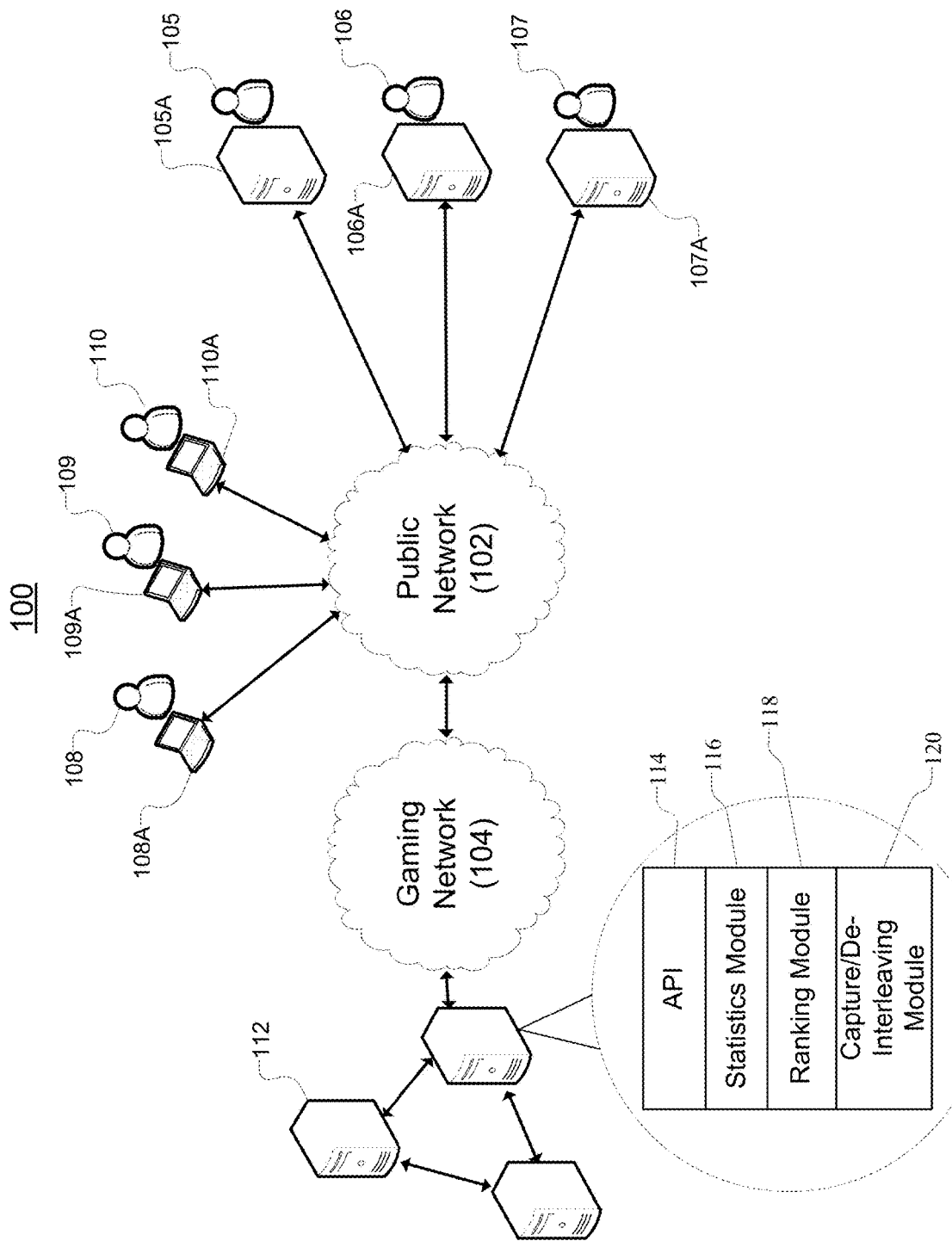
FIG. 1 illustrates an example of a network environment in which some aspects of the technology can be implemented.

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Competitive gaming, commonly referred to as electronic sports or "eSports," involve the play of video games in a competitive environment. Videogame competitions have existed for nearly as long as video games themselves. Early competitions were set up as tournament style matches between players focused on one particular game, often tied to a new product release. Eventually, competitive leagues and a constant stream of tournaments evolved to provide structure for the eSports community. Players now have the option of competing in a vast array of professional and amateur competitions held at physical locations or in virtual competitions conducted online. Leagues and content providers such as Major League Gaming (MLG), and Global StarCraft® League, provide opportunities for competition and to find information about competitive gaming. Until recently, participation in competitive gaming has demonstrated a gradual and steady pace in growth. However, competitive gaming is presently undergoing a rapid expansion in participation and interest.

As the interest in competitive gaming increases, so does the demand for spectator streaming and player interest in comparing game performance, for example, between players, game titles and/or gaming leagues, etc. Additionally, as competitive eSports gather the attention of greater numbers of users/players, there is an increasing advertiser incentive to gather and analyze gameplay data, for example, to better understand the ad consuming players/users and improve targeted advertisement delivery. It would be advantageous for captured gameplay data to be processed in a manner that facilitates convenient searching of gameplay statistics, as well as the recall of game video feeds.

Aspects of the disclosed technology address the foregoing need by providing systems, methods and machine-readable media for de-interleaving captured gameplay data into constituent video data and statistical metadata portions. Aspects of the technology also provide features to facilitate the storage of video data and statistical metadata into separate databases for further processing, such as indexing that is performed to facilitate search and retrieval of interesting gameplay events.

In some embodiments, the technology also provides methods for repairing or fixing corrupted gameplay data (e.g., video data and/or statistical metadata), and interleaving the corrected data to reconstruct recorded gameplay scenarios, such as highlights of competitive play, or notable tournament events, etc.

In some aspects, the manipulation of de-interleaved gaming data can facilitate selected or altered re-rendering of gameplay scenarios, for example, to produce feeds that provide the consuming user with a preferred viewing angle or other perspectives with which to select and view interesting events.

FIG. 1 illustrates an example of network environment 100 in which some aspects of the technology can be implemented. Environment 100 includes public network 102, which can include one or more private networks, such as, a local area network (LAN), a wide area network (WAN), or a network of public/private networks, such as the Internet. Public network 102 is communicatively coupled to gaming network 104 that represents a network of computing resources configured for implementing gaming game management platform 112 of the subject technology.

Public network 102, and gaming network 104 provide player and developer access to game management platform 112. As illustrated, players 108, 109, and 110 are permitted access to game management platform 112 using respective client devices (e.g., 108A, 109A, and 110A). Although client devices 108A, 109A, and 110A, are depicted as personal computing devices, it is understood that the client devices can include various types of processor-based systems, including but not limited to: game consoles, smart phones, tablet computer systems, and the like. Example of hardware systems that can be used to implement the client device are discussed in further detail below with respect to FIG. 4. Similarly, developers (e.g., 105, 106 and 107), are permitted access to game management platform via respective their computing systems (e.g., 105A, 106A, and 107A). It is understood that a greater (or fewer) number of players and/or developers can be engaged with environment 100, without departing from the scope of the technology.

In practice, platform 112 is configured to support user/player interaction with virtually any number gaming environments (titles) and by extension, interaction with virtually any number of other users/players/social acquaintances. Gaming platform 112 can also facilitate the creation and support of tournament style gaming competitions between players and for multiple different game titles, and to provide the interfaces (dashboard) necessary to enable users/players to define parameters for game capture and playback. As such, management system 112 is configured to facilitate player competition across game genres, as well as to facilitate the selection, capture, and distribution of competitive gameplay events.

By way of example, developers 105, 106, and/or 107 can be developers of different game titles, each of which is associated with a different genre. To facilitate league competition for their games, each of the developers can submit game-performance attributes to the league, e.g., using respective computing systems 105A, 106A, and 107A. In a similar manner, the creation of gaming leagues and corresponding league parameters can be managed at the player level, for example, by one or more of players 108, 109, and/or 110. That is, individual players or player collectives can provide specific game-performance attributes that they would like implemented to structure their own individualized league play.

Although game-performance attributes can include virtually any type of information that can be used in conjunction with the creation, execution, management, and/or promotion of a gaming league, in some aspects, game-performance attribute information can include game characteristics, including but not limited to one or more of: a "match type," "event information," and/or a player access list, etc. Game attributes information can also include game statistics, including but not limited to "high-level" player statistics such as: win/loss records, play time duration, levels achieved, points scored, and/or an ELO rating, etc. In some aspects, game statistics include "low-level" player statistics, including but not limited to: map-position information, map-path information, shots fired, time with rifle, time in kneel, time running, time to first fix, time to acquire a target, (e.g., "quick-draw" metrics), and/or measures of player/avatar health, etc.

The game-performance attributes, including gameplay data recorded (captured) or received by game management platform 112, for example, using an application programming interface (API), such as API 114. Subsequently, the game-performance attributes can be passed from API 114 to statistics module 116 for use in player analysis. In a similar manner, game-play statistics can be collected by API 114 and passed to statistics module 116.

Depending on implementation, gameplay data can be collected via active monitoring of an online game environment, or received from one or more external systems, for example, as part of a game performance data set that includes information describing individual player (or player-team) performance for one or more game titles and/or genre categories. In some aspects, relative player (or player team) performance can be assessed, for example, in the context of competitive/tournament play, using ranking module 118.

As discussed above, monitoring of a game environment (e.g., for a single game title or for multiple game titles), can be performed based on user defined event attributes that indicate when game capture is to be performed, and what aspects behaviors/events are to be recorded. In practice, capture/de-interleaving module 120 is configured to record and/or stream those portions of gameplay that have been preselected by user defined event attributes provided to a dashboard provided by management system 112. More specifically, capture/de-interleaving module is configured to capture gameplay data, and to disaggregate (de-interleave) video data and statistical metadata portions of the captured gameplay data. As used herein, "video data" can include information relating to the replay of captured visual and auditory gameplay events. For example, video data can include information or data that users, players, or advertisers, etc., can use to replay and watch previously captured gameplay. As used herein, "statistical metadata" can include any data or information describing events that occurred in the game environment, including but not limited to: player performance statistics (e.g., high scores, levels obtained, win/loss records, etc.), relativistic player information, such as, relative player rankings, and/or game characteristic information, (e.g., game title, version and/or genre information), etc.

Figure 2:
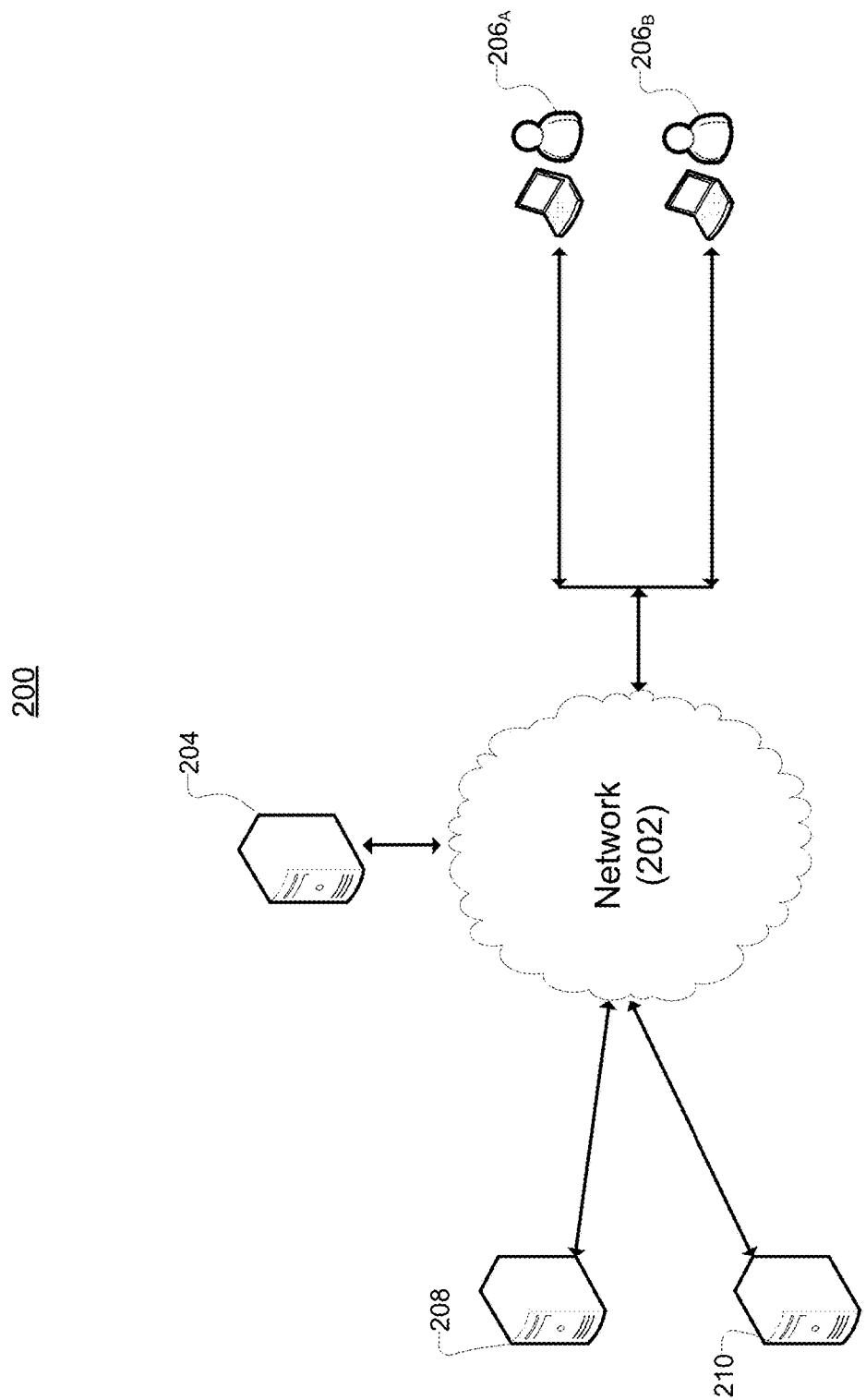
FIG. 2 conceptually illustrates an example network environment in which a de-interleaving process of the disclosed technology may be implemented.

FIG. 2 conceptually illustrates an environment in which game data can be captured and de-interleaved, according to some aspects of the technology.

In the example of FIG. 2, users 206 are communicatively coupled to a gaming platform 204 via network 202. Platform 204 can be configured to provide a dashboard and monitoring systems necessary to receive user-defined statistical variables (e.g., event attributes), and to provide streaming video content of captured gaming events. For example, platform 204 can include software and/or hardware necessary to perform the capture and de-interleaving of game data, e.g., using a capture/de-interleaving module, such as de-interleaving module 120, discussed above with respect to FIG. 1.

In practice, gameplay data that is de-interleaved at platform 204 can be stored to separate databases and/or servers, such as video data server 208 and statistical metadata server 210. Although servers 208, 210 are represented as separate physical systems, it is understood that the de-interleaved portions of gameplay data (e.g., video/statistical metadata) may be stored in separate databases residing on the same physical device, or in separate databases that are distributed across one or more networking devices.

As discussed in further detail below with respect to FIG. 3, de-interleaved video data and statistical metadata can be indexed (to facilitate searching), repaired (e.g., to eliminate corrupted data), modified (e.g., to alter game playback characteristics), and/or re-interleaved, for example, to reconstruct captured gameplay events.

Figure 3:
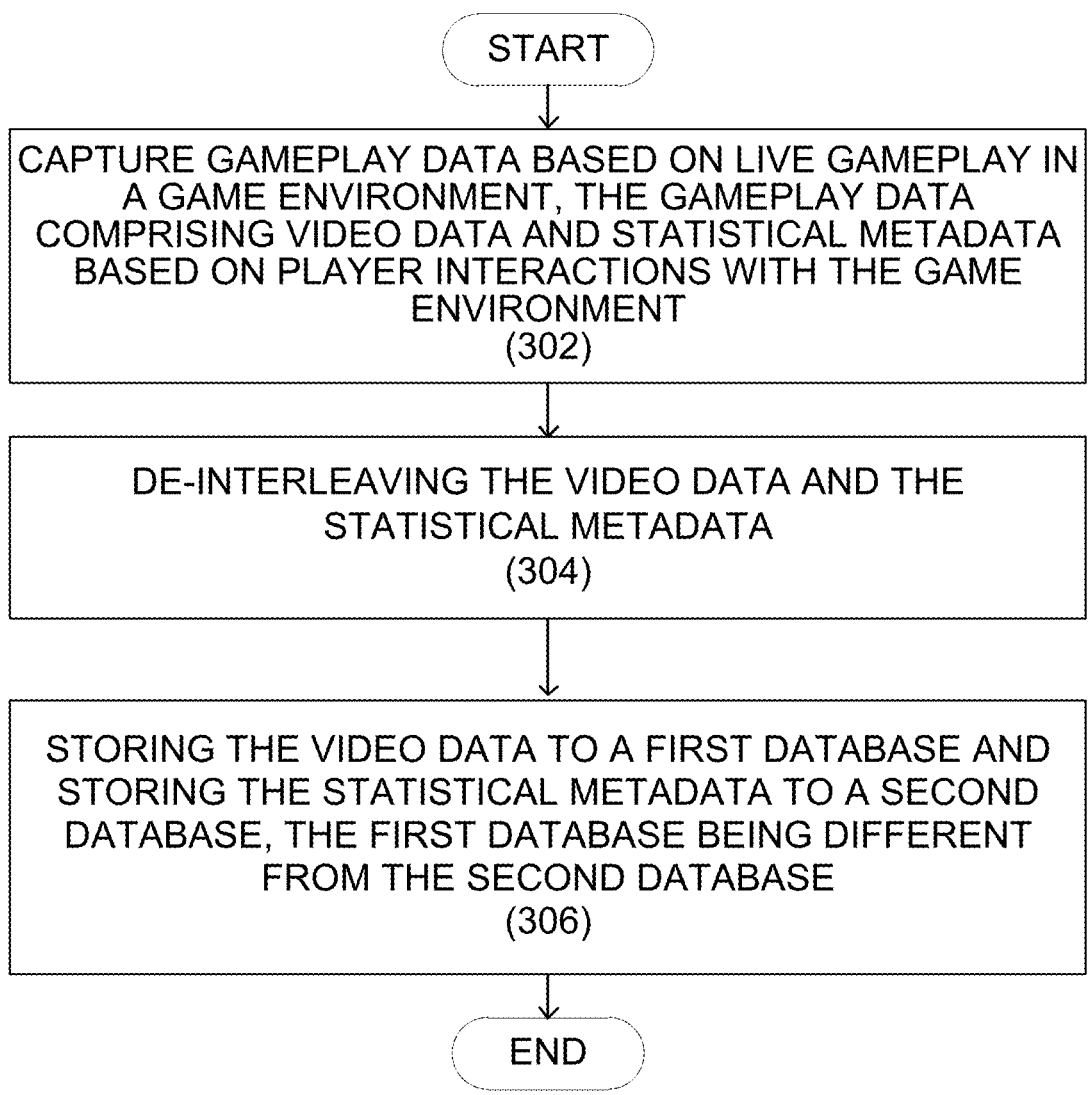
FIG. 3 illustrates steps of an example process for de-interleaving gameplay data, according to some aspects of the technology.

FIG. 3 illustrates steps of an example process 300 for capturing gameplay data, and for de-interleaving gameplay data into constituent statistical metadata and video data portions. Process 300 begins with step 302 in which, gameplay data based on live gameplay in a gaming environment is captured, wherein the gameplay data includes interleaved video data and statistical metadata.

In step 304, the captured gameplay data is (disaggregated) de-interleaved into separate video data and statistical metadata portions. The de-interleaving of gameplay data can be performed by one or more software/hardware modules, such as by a de-interleaving module (e.g., de-interleaving module 120), discussed above.

In step 306, the separate video data and statistical metadata portions are stored to different logical locations, such as to different databases, or to physically separate devices, e.g., memory structures or servers, etc. Once disaggregated, video data and statistical metadata can be further processed, such as to perform indexing or further metadata tagging, In some aspects, indexing of video data and/or statistical metadata can facilitate the easy query of interesting gaming events. As such, players/users may more easily search video feeds, e.g., to watch re-runs of interesting gameplay events. In another example, advertisers may be able to easily search statistical metadata to help identify users or scenarios that may be good candidates for advertisement delivery.

Figure 4:
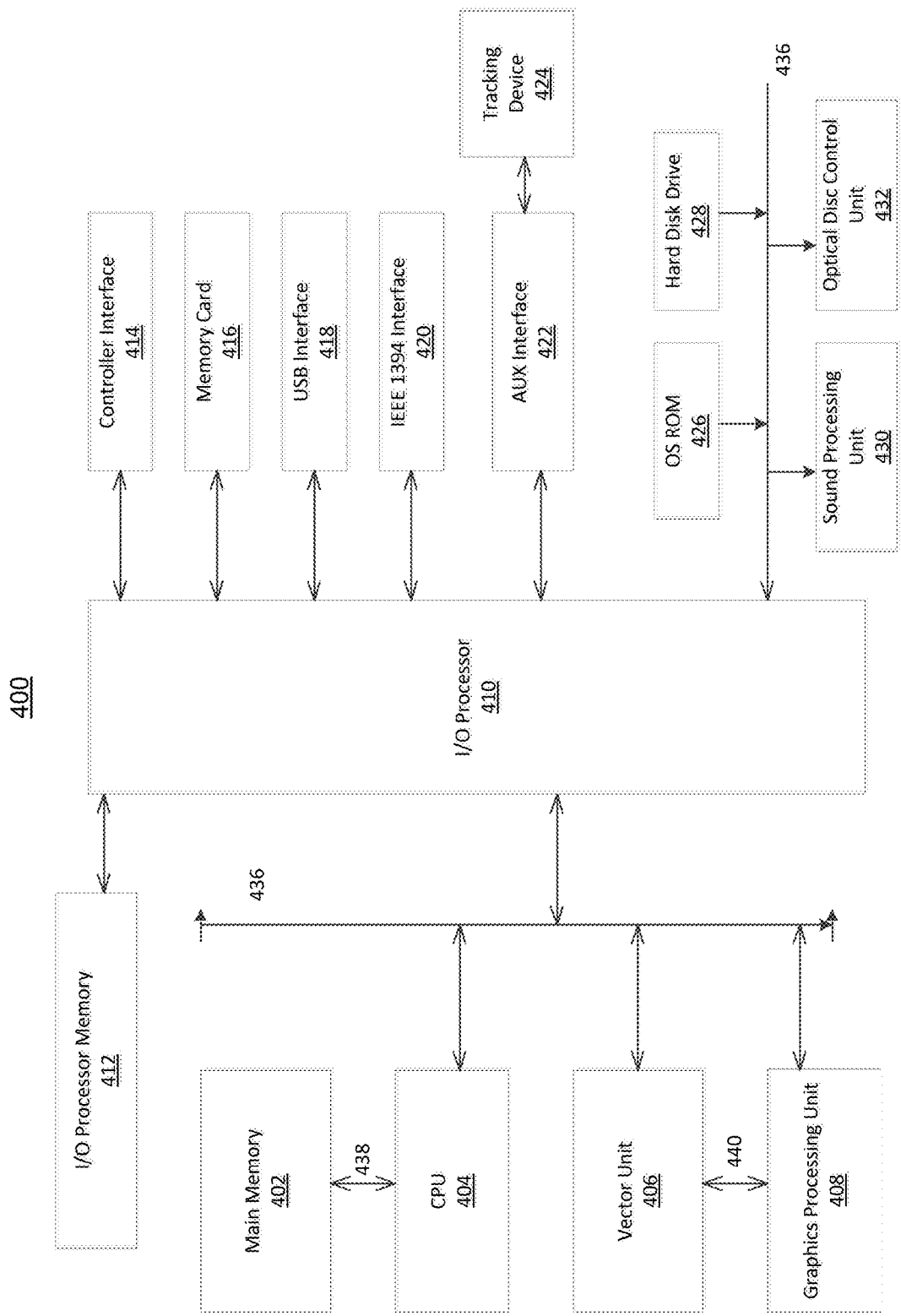
FIG. 4 illustrates an example of an electronic system with which some aspects of the subject technology can be implemented.

FIG. 4 is an exemplary user device 400. User device 400 (e.g., desktop, laptop, tablet, mobile device, console gaming system) is a device that the user can utilize to facilitate carrying out features of the present invention pertaining to the viewing of third party content.

The user device 400 may include various elements as illustrated in FIG. 4. It should be noted that the elements are exemplary and that other embodiments may incorporate more or less than the elements illustrated. With reference to FIG. 4, the user device 400 includes a main memory 402, a central processing unit (CPU) 404, at least one vector unit 406, a graphics processing unit 408, an input/output (I/O) processor 410, an I/O processor memory 412, a controller interface 414, a memory card 416, a Universal Serial Bus (USB) interface 418, and an IEEE 1394 interface 420, an auxiliary (AUX) interface 422 for connecting a tracking device 424, although other bus standards and interfaces may be utilized. The user device 400 further includes an operating system read-only memory (OS ROM) 426, a sound processing unit 428, an optical disc control unit 430, and a hard disc drive 432, which are connected via a bus 434 to the I/O processor 410. The user device 400 further includes at least one tracking device 424.

The tracking device 424 may be a camera, which includes eye-tracking capabilities. The camera may be integrated into or attached as a peripheral device to user device 400. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 424 may include a microphone integrated into or attached as a peripheral device to user device 400 that captures voice data. The microphone may conduct acoustic source localization and/or ambient noise suppression.

Alternatively, tracking device 424 may be the controller of the user device 400. The controller may use a combination of built-in accelerometers and infrared detection to sense its position in 3D space when pointed at the LEDs in a sensor nearby, attached to, or integrated into the console of the entertainment system. This design allows users to control functionalities of the user device 400 with physical gestures as well as button-presses. The controller connects to the user device 400 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device 400 may be an electronic gaming console. Alternatively, the user device 400 may be implemented as a general-purpose computer, a set-top box, or a hand-held gaming device. Further, similar user devices may contain more or less operating components.

CPU 404, vector unit 406, graphics processing unit 408, and I/O processor 410 communicate via system bus 436. Further, the CPU 404 communicates with the main memory 402 via a dedicated bus 438, while the vector unit 406 and the graphics processing unit 408 may communicate through a dedicated bus 440. The CPU 404 executes programs stored in the OS ROM 426 and the main memory 402. The main memory 402 may contain pre-stored programs and programs transferred through the I/O Processor 410 from a CD-ROM, DVD-ROM, or other optical disc (not shown) using the optical disc control unit 432. The I/O processor 410 primarily controls data exchanges between the various devices of the user device 400 including the CPU 404, the vector unit 406, the graphics processing unit 408, and the controller interface 414.

The graphics processing unit 408 executes graphics instructions received from the CPU 404 and the vector unit 406 to produce images for display on a display device (not shown). For example, the vector unit 406 may transform objects from three-dimensional coordinates to two-dimensional coordinates, and send the two-dimensional coordinates to the graphics processing unit 408. Furthermore, the sound processing unit 430 executes instructions to produce sound signals that are outputted to an audio device such as speakers (not shown).

A user of the user device 400 provides instructions via the controller interface 414 to the CPU 404. For example, the user may instruct the CPU 404 to store certain information on the memory card 416 or instruct the user device 400 to perform some specified action.

Other devices may be connected to the user device 400 via the USB interface 418, the IEEE 1394 interface 420, and the AUX interface 422. Specifically, a tracking device 424, including a camera or a sensor may be connected to the user device 400 via the AUX interface 422, while a controller may be connected via the USB interface 418.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A system for providing game play channels, the system comprising:
    one or more processors;
    a network interface coupled to the one or more processors; and
    a non-transitory memory coupled to the one or more processors, the memory comprising instructions stored therein, which when executed by the processors, cause the processors to perform operations comprising:
        capturing gameplay data based on live gameplay in a game environment, the gameplay data comprising video data and statistical metadata based on player interactions with the game environment;
        de-interleaving the video data and the statistical metadata;
        storing the video data to a first database;
        storing the statistical metadata to a second database, wherein the first database is different from the second database;
        repairing statistical metadata corresponding to corrupted gameplay data; and
        re-interleaving the video data and the repaired statistical metadata to create a simulation of the live gameplay in the game environment.

2. The system of claim 1, wherein the processors further perform operations comprising:
    receiving the video data from the first database;
    receiving the statistical metadata from the second database; and
    re-interleaving the video data and the statistical metadata.

3. The system of claim 1, wherein the processors further perform operations comprising repairing the video data corresponding to the corrupted gameplay data, wherein the repaired video data is re-interleaved with the repaired statistical metadata to create the simulation of the live gameplay in the game environment.

4. The system of claim 1, wherein the processors further perform operations comprising:
    indexing the statistical metadata to produce indexed metadata; and
    searching for a specified event based on the indexed metadata.

5. The system of claim 1, wherein the processors further perform operations comprising:
    indexing the video data to produce indexed video data; and
    searching for a specified event based on the indexed video data.

6. The system of claim 1, wherein the processors further perform operations comprising:
    processing the statistical metadata to identify two or more gameplay events; and
    parsing the statistical metadata based on the two or more gameplay events, wherein the parsed statistical metadata is stored to the second database.

7. The system of claim 1, wherein the created simulation include a set of event highlight within a current game session or within a tournament associated with the current game session.

8. The system of claim 1, wherein the processors further perform operations comprising re-rendering at least a part of the de-interleaved video data, wherein the re-rendered video data is re-interleaved with the repaired statistical data.

9. The system of claim 8, wherein the processors re-render the video data to alter a playback characteristic of the video data.

10. The system of claim 9, wherein the playback characteristic includes a viewing angle of the game environment.

11. The system of claim 8, wherein the processors further perform operations comprising selecting the part of the de-interleaved video data for re-rendering.

12. The system of claim 1, wherein de-interleaving the video data and the statistical metadata comprises disaggregating visual data and auditory data from the gameplay data, wherein the de-interleaved video data includes the disaggregated visual data and auditory data.

13. The system of claim 1, wherein de-interleaving the video data and the statistical metadata comprises disaggregating game attribute data that is not visual data and not auditory data from the gameplay data, wherein the de-interleaved statistical metadata includes the disaggregated game attribute data.

14. A method for managing an online gaming league, the method comprising:
- capturing gameplay data based on live gameplay performed in a game environment, the gameplay data comprising video data and statistical metadata based on player interactions with the game environment;
- de-interleaving the video data and the statistical metadata;
- storing the video data to a first database;
- storing the statistical metadata to a second database, wherein the first database is different from the second databases;
- repairing the statistical metadata corresponding to corrupted gameplay data; and
- re-interleaving the video data and the repaired statistical metadata to create a simulation of the live gameplay in the game environment.

15. The method of claim 14, further comprising:
- receiving the video data from the first database;
- receiving the statistical metadata from the second database; and
- re-interleaving the video data and the statistical metadata.

16. The method of claim 14, further comprising repairing the video data corresponding to the corrupted gameplay data, wherein the repaired video data is re-interleaved with the statistical metadata to create the simulation of the live gameplay in the game environment.

17. The method of claim 14, further comprising:
- indexing the statistical metadata to produce indexed metadata; and
- searching for a specified event based on the indexed metadata.

18. The method of claim 14, further comprising:
- indexing the video data to produce indexed video data; and
- searching for a specified event based on the indexed video data.

19. The method of claim 14, further comprising:
- processing the statistical metadata to identify two or more gameplay events; and
- parsing the statistical metadata based on the two or more gameplay events wherein the parsed statistical metadata is stored to the second database.

20. A non-transitory computer-readable storage medium, having embodied thereon a program executable by a processor to perform operations comprising:
- capturing gameplay data based on live gameplay performed in a game environment, the gameplay data comprising video data and statistical metadata based on player interactions with the game environment;
- de-interleaving the video data and the statistical metadata;
- storing the video data to a first database;
- storing the statistical metadata to a second database, wherein the first database is different from the second databases;
- repairing statistical metadata corresponding to corrupted gameplay data; and
- re-interleaving the video data and the repaired statistical metadata to create a simulation of the live gameplay in the game environment.

* * * * *